(12) United States Patent
Vinay et al.

(10) Patent No.: US 12,461,996 B2
(45) Date of Patent: Nov. 4, 2025

(54) SYSTEMS AND METHODS FOR COMPONENT DETECTION IN A MANUFACTURING ENVIRONMENT

(71) Applicant: Ford Global Technologies, LLC, Dearborn, MI (US)

(72) Inventors: Ranjanikar Vinay, Tamilnadu (IN); Vipul Jirge, Maharashtra (IN); Chekuri Prudhveeraju, Tamilnadu (IN); Chhapparghare Hivraj Vijay, Maharashtra (IN)

(73) Assignee: Ford Global Technologies, LLC, Dearborn, MI (US)

( * ) Notice: Subject to any disclaimer, the term of this patent is extended or adjusted under 35 U.S.C. 154(b) by 407 days.

(21) Appl. No.: 17/986,572

(22) Filed: Nov. 14, 2022

(65) Prior Publication Data

US 2024/0095311 A1 Mar. 21, 2024

(30) Foreign Application Priority Data

Sep. 16, 2022 (IN) ............................. 202241053115

(51) Int. Cl.
  *G06F 18/2431* (2023.01)
  *G06T 3/40* (2006.01)
  (Continued)

(52) U.S. Cl.
  CPC ............ *G06F 18/2431* (2023.01); *G06T 3/40* (2013.01); *G06T 3/60* (2013.01); *G06T 7/11* (2017.01);
  (Continued)

(58) Field of Classification Search
  CPC . G06T 2207/30108; G06T 2207/10028; G06T 2207/30164; G06T 7/11;
  (Continued)

(56) References Cited

U.S. PATENT DOCUMENTS

| 9,472,022 B2 | 10/2016 | Neumann et al. |
| 10,354,411 B2 | 7/2019 | Fu et al. |
| 11,055,562 B1* | 7/2021 | Haeusler ................ B25J 9/1697 |
| 11,688,161 B2* | 6/2023 | Mousavian .......... G06V 10/255 |
| | | 382/103 |
| 2010/0164951 A1* | 7/2010 | Stewart ................ G01B 11/105 |
| | | 345/419 |
| 2014/0098094 A1* | 4/2014 | Neumann ............ G06V 20/653 |
| | | 345/420 |

(Continued)

FOREIGN PATENT DOCUMENTS

CN 110991509 4/2020

*Primary Examiner* — Andrew W Bee
*Assistant Examiner* — Caleb L Esquino
(74) *Attorney, Agent, or Firm* — Burris Law, PLLC

(57) ABSTRACT

A method includes segmenting point cloud data of an image into a plurality of input clusters, wherein each of the plurality of input clusters includes a given set of point cloud data from among the point cloud data. The method includes, for each of the plurality of input clusters: selectively filtering the given set of point cloud data to identify production component cloud data (PCCD), aligning the PCCD with a predefined axis to generate a rotated PCCD, classifying the given set of the plurality of production components into one or more asset types based on the rotated PCCD, generating a three-dimensional bounding box based on the rotated PCCD, segmenting the rotated PCCD into a plurality of production clusters, and determining one or more parameters associated with the given set of the plurality of production components based on the plurality of production clusters and the one or more asset types.

20 Claims, 6 Drawing Sheets

(51) Int. Cl.
*G06T 3/60* (2006.01)
*G06T 7/11* (2017.01)
*G06T 7/30* (2017.01)

(52) U.S. Cl.
CPC ...... *G06T 7/30* (2017.01); *G06T 2207/20132* (2013.01); *G06T 2207/30108* (2013.01); *G06T 2207/30164* (2013.01)

(58) Field of Classification Search
CPC .... G06T 7/30; G06T 3/14; G06T 7/80; G06T 19/20; G06T 17/00; G06V 10/82; G06V 2201/12; G06F 18/2431
See application file for complete search history.

(56) References Cited

U.S. PATENT DOCUMENTS

| | | | |
|---|---|---|---|
| 2015/0003723 A1* | 1/2015 | Huang | G06V 20/653 |
| | | | 382/154 |
| 2018/0101160 A1* | 4/2018 | Desjardien | G06T 7/0004 |
| 2018/0330149 A1* | 11/2018 | Uhlenbrock | G06T 7/11 |
| 2019/0287299 A1* | 9/2019 | Wu | G06T 17/10 |
| 2020/0410064 A1* | 12/2020 | Bauer | G06N 3/08 |
| 2021/0019501 A1* | 1/2021 | Kurita | G06V 40/103 |
| 2021/0103776 A1* | 4/2021 | Jiang | G06T 19/20 |

* cited by examiner

SYSTEMS AND METHODS FOR COMPONENT DETECTION IN A MANUFACTURING ENVIRONMENT

CROSS-REFERENCE TO RELATED APPLICATION

This application claims priority to and the benefit of Indian Patent Application No. 202241053115, filed on Sep. 16, 2022. The disclosure of the above application is incorporated herein by reference.

FIELD

The present disclosure relates to systems and methods for component detection in a manufacturing environment.

BACKGROUND

The statements in this section merely provide background information related to the present disclosure and may not constitute prior art.

In a manufacturing environment, component detection and pose estimation is utilized to perform automated assembly tasks. As an example, a control system may perform a machine-learning routine to detect a particular component, determine one or more parameters associated with the component, and instruct another manufacturing system, such as a robot or machining device, to perform an automated task based on the one or more parameters. However, machine-learning routines may require large amounts of training data and time to properly train the control system to accurately perform component detection routines. These issues associated with machine-learning routines, among other issues, are addressed by the present disclosure.

SUMMARY

This section provides a general summary of the disclosure and is not a comprehensive disclosure of its full scope or all of its features.

The present disclosure provides a method for identifying a plurality of production components of a manufacturing environment. The method includes segmenting point cloud data of an image into a plurality of input clusters, where each of the plurality of input clusters includes a given set of point cloud data from among the point cloud data. The method includes, for each of the plurality of input clusters: selectively filtering the given set of point cloud data to identify production component cloud data (PCCD) associated with a given set of the plurality of production components, aligning the PCCD with a predefined axis to generate a rotated PCCD, classifying the given set of the plurality of production components into one or more asset types based on the rotated PCCD, and generating a three-dimensional bounding box based on the rotated PCCD. The method includes segmenting the rotated PCCD into a plurality of production clusters, where each of the plurality of production clusters includes a given set of the rotated PCCD and determining one or more parameters associated with the given set of the plurality of production components based on the plurality of production clusters and the one or more asset types.

The present disclosure provides a system for identifying a plurality of production components of a manufacturing environment. The system includes one or more processors and one or more nontransitory computer-readable mediums comprising instructions that are executable by the one or more processors. The instructions include segmenting point cloud data of an image into a plurality of input clusters, where each of the plurality of input clusters includes a given set of point cloud data from among the point cloud data. The instructions includes, for each of the plurality of input clusters: selectively filtering the given set of point cloud data to identify production component cloud data (PCCD) associated with a given set of the plurality of production components, aligning the PCCD with a predefined axis to generate a rotated PCCD, classifying the given set of the plurality of production components into one or more asset types based on the rotated PCCD, and generating a three-dimensional bounding box based on the rotated PCCD. The instructions include segmenting the rotated PCCD into a plurality of production clusters, where each of the plurality of production clusters includes a given set of the rotated PCCD and determining one or more parameters associated with the given set of the plurality of production components based on the plurality of production clusters and the one or more asset types.

In one form, the point cloud data is segmented based on a predefined Euclidean distance, a predefined number of clusters, and a predefined cluster density. In one form, the method or instructions further include downsampling image data of the image to generate the point cloud data. In one form, selectively filtering the given set of point cloud data to identify the PCCD further comprises removing nonproduction component cloud data (NCCD) from among the given set of point cloud data, and where the NCCD is associated with one or more nonproduction components. In one form, the NCCD has a dimension ratio that is less than a threshold dimension ratio, and where the dimension ratio is based on a length of the given set of point cloud data and a width of the given set of point cloud data. In one form, the rotated PCCD corresponds to an isometric view of the set of production components. In one form, the predefined axis is based on a predefined tilt angle, a predefined rotation angle, or a combination thereof. In one form, classifying the given set of the plurality of production components into the one or more asset types is further based on a convolutional neural network routine.

In one form, generating the three-dimensional bounding box based on the rotated PCCD further comprises generating a two-dimensional bounding box associated with the given set of the plurality of production components based on the rotated PCCD and converting the two-dimensional bounding box into the three-dimensional bounding box. In one form, generating the two-dimensional bounding box associated with the given set of the plurality of production components is further based on a point-in-polyhedron routine. In one form, converting the two-dimensional bounding box into the three-dimensional bounding box is further based on a cropping routine. In one form, the rotated PCCD is segmented based on a predefined Euclidean distance, a predefined number of clusters, and a predefined cluster density. In one form, the one or more parameters associated with the given set of the plurality of production components include a length, a width, a height, an orientation, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
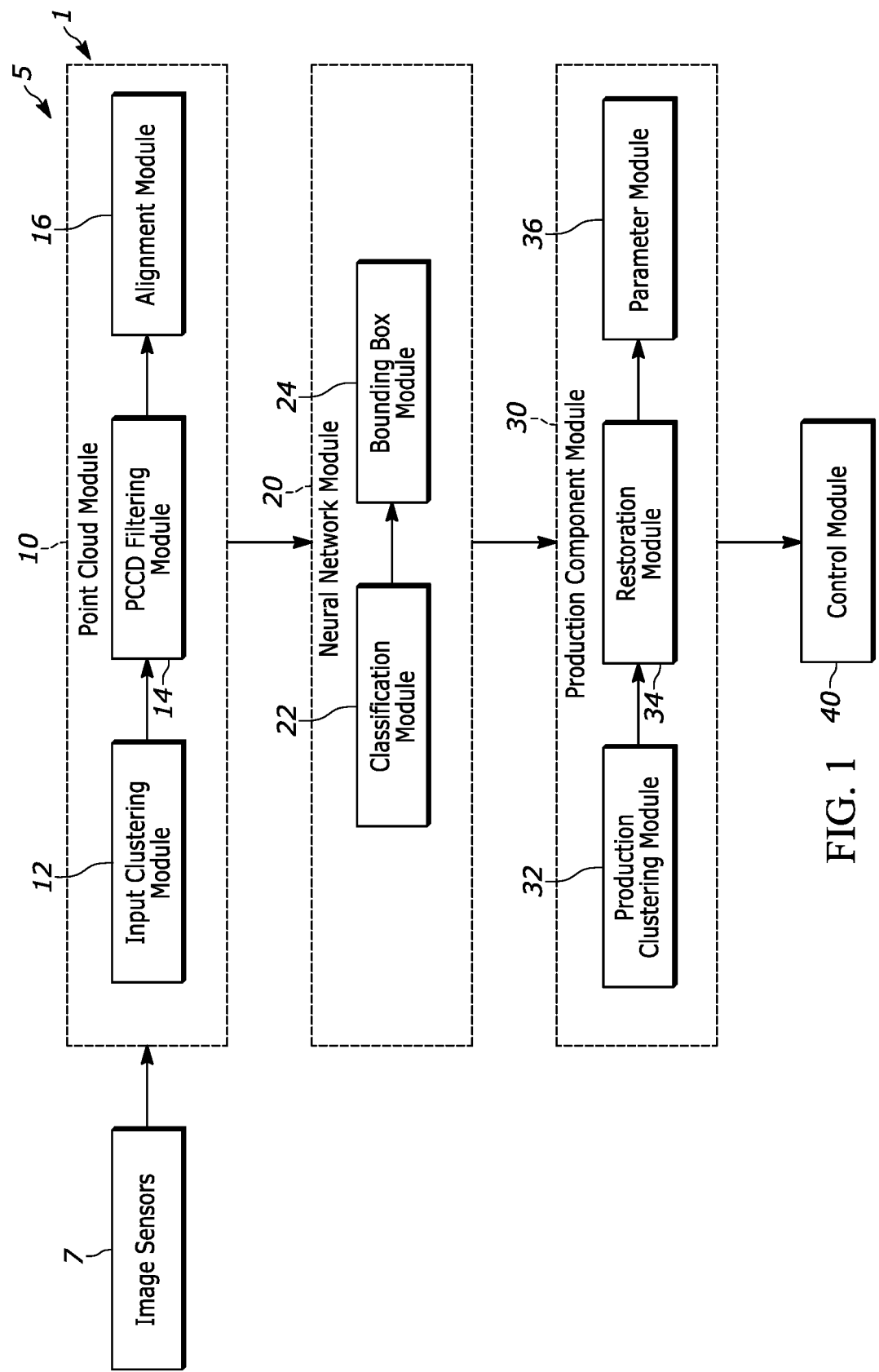
FIG. 1 is a functional block diagram of a manufacturing environment component detection system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a component identification system for identifying production components of a manufacturing environment. The component identification system performs a segmentation routine based on image data of various components within the manufacturing environment prior to performing various machine learning and/or deep learning routines, such as a convolutional neural network routine, to classify and determine one or more parameters associated with the components. By performing segmentation and machine learning/deep learning routines to identify components within the manufacturing environment, the component identification system can selectively control various manufacturing processes and/or generate alerts/notifications based on the parameters of the components without the use of an operator.

Referring to FIG. 1, a component detection system 1 provided in a manufacturing environment 5 for detecting one or more components is shown. The component detection system 1 generally includes image sensors 7, a point cloud module 10, a neural network module 20, a production component module 30, and a control module 40. While the image sensors 7, the point cloud module 10, the neural network module 20, and the production component module 30 are illustrated as part of the manufacturing environment 5, it should be understood that any one of the components of the component detection system 1 may be positioned remotely from the manufacturing environment 5 in other forms. In one form, the image sensors 7, the point cloud module 10, the neural network module 20, the production component module 30, and the control module 40 are communicably coupled using a wired and/or wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

Figure 2:
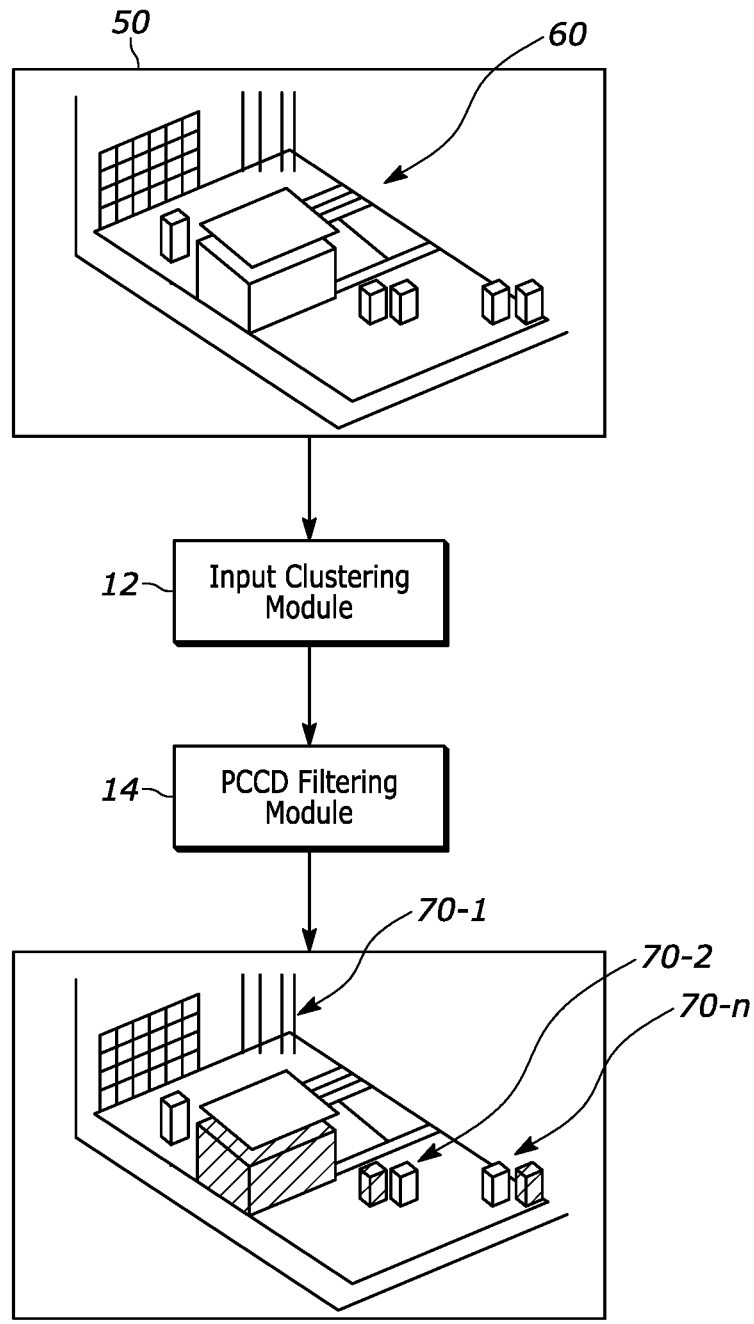
FIG. 2 illustrates point cloud data and a plurality of input clusters in accordance with the teachings of the present disclosure.

In one form, the image sensors 7 obtain image data of the manufacturing environment 5 and may include, but are not limited to: a three-dimensional (3D) camera, a 3D scanner, an infrared sensor, a radar scanner, a laser scanner, a light detection and ranging (LIDAR) sensor, and/or an ultrasonic sensor. In one form, the image may include point cloud data, where each point cloud datapoint of the point cloud data is indicative of a 3D location and/or orientation of a surface and/or edge of a component of the manufacturing environment 5. In one form, each point cloud datapoint is indicative of a reflectance, luminosity, and/or color of the surface and/or edge of a component of the manufacturing environment 5. Additionally, each point cloud datapoint may define a 3D location and a color (e.g., a red-blue-green (RGB) value) of the surface and/or edge of a component of the manufacturing environment 5. As an example and as shown in FIG. 2, the image sensors 7 may obtain an image 50 having a plurality of point cloud data points 60, where each point cloud data point defines a 3D coordinate and an RGB value of one or more detected components in the manufacturing environment 5.

The point cloud module 10 includes an input clustering module 12, a point cloud component data (PCCD) filtering module 14, and an alignment module 16. In some forms, the input clustering module 12 performs a downsampling routine on the image data to generate the point cloud data. The downsampling routine is configured to enhance the texture uniformity of the detected components and reduce the amount of required computational resources to perform the input clustering segmentation routine described below in further detail. As an example, the downsampling routine is configured to apply a box grid filter having a predefined size (e.g., 1.5 cm) to reduce the spatial resolution of the point cloud data points of the image. In some forms, the input clustering module 12 is configured to convert the image data into a predefined file type prior to or after performing the downsampling routine, such as a computer-aided design (CAD) file, a standard tessellation language (STL) file, and/or any other file type configured to provide a digital model representing the image data captured by the image sensors 7. It should be understood that the downsampling and file type conversion routines are optional steps and may not be performed in other variations.

In one form, the input clustering module 12 segments the point cloud data into a plurality of input clusters, where each cluster includes a set of the point cloud data points. The input clusters may be segmented based on a predefined Euclidean distance, a predefined number of clusters, a predefined cluster density, or a combination thereof. In one form, the Euclidean distance may indicate a distance relative to a centroid of the input cluster (e.g., 2.7 cm). Furthermore, the predefined number of clusters may indicate a maximum or minimum number of input clusters, and the predefined cluster density may indicate a maximum or minimum number of point cloud data points per input cluster (e.g., 800 point cloud data points). As an example and referring to FIG. 2, the input clustering module 12 may segment the point cloud data points 60 into input clusters 70-1, 70-2, . . . 70-$n$ (collectively referred to hereinafter as "input clusters 70") such that the Euclidean distance of each data point within a given cluster is less than a threshold distance value relative to a corresponding centroid and such that the cluster density is less than or equal to a predefined number of point cloud data points 60.

In one form, the PCCD filtering module 14 selectively filters, for each input cluster 70, the point cloud data points 60 to identify PCCD associated with production components of the manufacturing environment 5. As an example, the PCCD filtering module 14 identifies and removes nonproduction component cloud data (NCCD) from among the point cloud data points 60, which is associated with nonproduction components of the manufacturing environment 5. As used herein, "production components" refer to a workpiece and/or other systems/components that are configured to manipulate the workpiece by performing a manufacturing operation. Example production components include, but are not limited to: fixtures, robots, conveyors, machining equipment, tools, automated guided vehicles, pallets, among others. As used herein, "nonproduction components" refer to components that do not perform a manufacturing operation on the workpiece. Example nonproduction components include, but are not limited to: walls, beams, racks, shelving, fencing, among others.

To identify the PCCD and the NCCD, the PCCD filtering module 14 determines a dimension ratio of a given input cluster 70. In one form, the dimension ratio is based on a length of the input cluster (e.g., a one-dimensional Y-coordinate displacement between the point cloud data points associated with the largest and smallest Y-coordinate value) and a width of the input cluster (e.g., a one-dimensional X-coordinate displacement between the point cloud data points associated with the largest and smallest X-coordinate value). As an example, when the dimension ratio is greater than a threshold dimension ratio (e.g., the length/width or width/length ratio is greater than 4), the PCCD filtering module 14 determines the point cloud data points 60 is associated with a nonproduction component, such as a beam.

Figure 3:
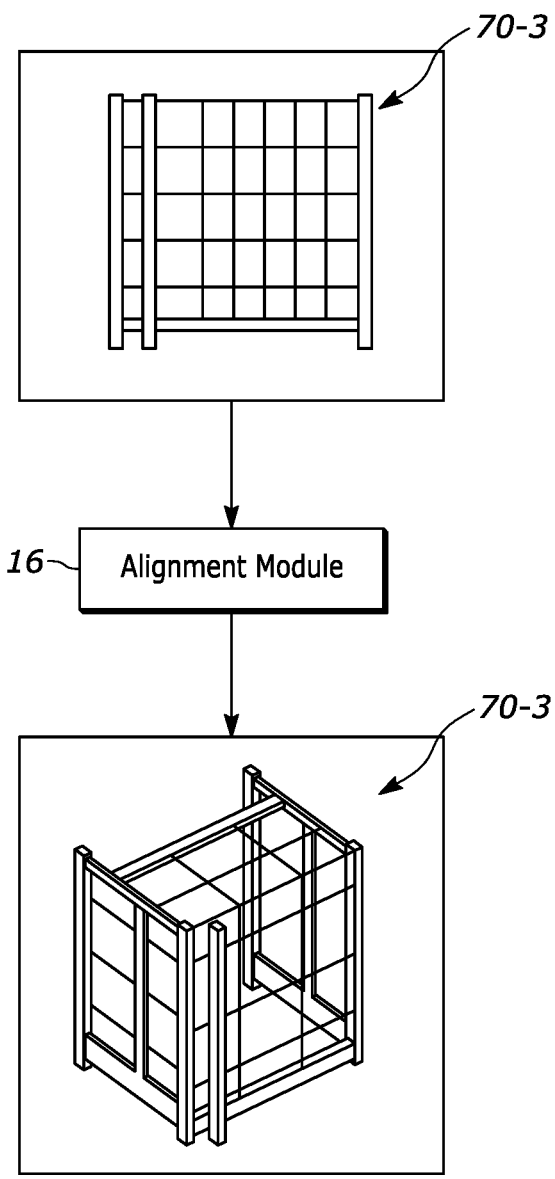
FIG. 3 illustrates rotated production component cloud data in accordance with the teachings of the present disclosure.

In one form, the alignment module 16 aligns, for the production components of the input clusters 70, the PCCD with a predefined axis to generate a rotated PCCD. In one form, the rotated PCCD corresponds to an isometric view of the production components. In one form, the predefined axis is based on a predefined tilt angle, a predefined rotation angle, or a combination thereof. As an example and as shown in FIG. 3, the alignment module 16 adjusts the orientation of the PCCD associated with input cluster 70-3 to align the PCCD with the predefined axis such that the rotated PCCD has a vertical tilt between 10 and 30 degrees (as the predefined tilt angle) and has a horizontal rotation angle of 11 degrees (as the predefined rotation angle). It should be understood that the rotated PCCD may have various predefined tilt angles and/or predefined rotation angles and is not limited to the example described herein.

To align the PCCD with the predefined axis, the alignment module 16 may perform a tug of points routine. Specifically, the tug of points routine includes incrementally rotating the PCCD from 1 degree to 90 degrees with a step value of 1 degree about the predefined axis. At each increment, the alignment module 16 generates a plurality of reference points along the boundary of the PCCD (e.g., sixteen reference points). For each reference point, the alignment module 16 identifies and calculates a distance between the reference point and a nearest point cloud data point from among the PCCD by performing, for example, a k-nearest neighbors (KNN) routine. Subsequently, the alignment module 16 determines, for each rotation value (e.g., at each of 1 degree, 2 degrees, and so on), a sum of the distances between each reference point and the nearest point cloud data point and identifies a minimum sum of distances at each rotation value (e.g., the minimum sum of distances occurs when the PCCD is rotated by thirty seven degrees) and designating the corresponding rotation value as a test rotation value for rotating the PCCD about the predefined axis. To perform the functionality described herein, it should be understood that the alignment module 16 may be trained using known KNN training routines to identify proximate the point cloud data points and calculate the distance between the corresponding reference point and the point cloud data points.

In one form, the neural network module 20 includes a classification module 22 and a bounding box module 24. The classification module 22 is configured to classify the production components of the input clusters 70 as one or more asset types based on the rotated PCCD. As an example, the classification module 22 may perform a convolutional neural network (CNN) routine and, as such, may include one or more convolutional layers and downsampling layers to classify the production components as one or more asset types. While CNN routines are described herein, it should be understood that the neural network module 20 may perform the morphological operations described herein using other routines, such as a computer vision routine.

Figure 4:
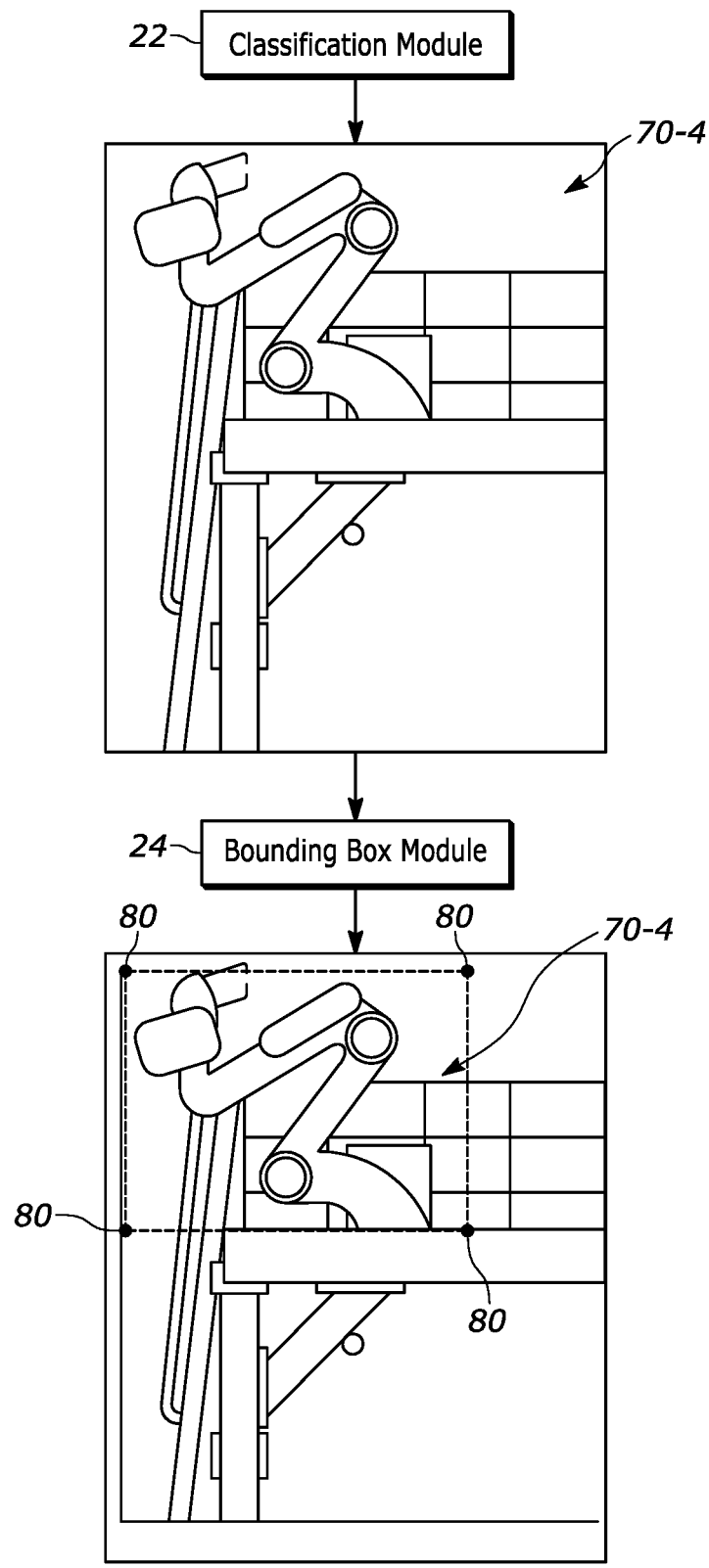
FIG. 4 illustrates a classified asset type of the rotated production component cloud data and a three-dimensional bounding box associated with one or more components in accordance with the teachings of the present disclosure.

As an example, the classification module 22 may include a convolutional layer that generates a plurality of feature maps associated with the rotated PCCD. The convolutional layer may be defined by any suitable combination of parameters including, but not limited to: kernel dimensions, number of kernels, stride values, padding values, input/output channels, bit depths, feature map widths/lengths, and rectified linear unit (ReLU) activation layers. As an example implementation of the convolutional layer, a kernel (e.g., a 7×7 kernel) may by iteratively applied to the rotated PCCD in accordance with a defined stride (e.g., a stride value of 2). The result of the convolution function at each iteration is output as a value in a feature map. Furthermore, the classification module 22 may include a downsampling layer that reduces the width and/or length of the feature maps generated by the convolution layer. The downsampling layer may be defined by any suitable combination of parameters including, but not limited to: the type of downsampling routine (e.g., a maximum pooling routine, an average pooling routine, an L2-norm pooling routine, among other downsampling routines), kernel dimensions, and sliding values. As an example and as shown in FIG. 4, the classification module 22 performs the CNN routines described herein to classify the rotated PCCD associated with input cluster 70-4 as a robot (as the asset type).

In one form, the bounding box module 24 generates, for the production components of each input cluster 70, a three-dimensional bounding box based on the rotated PCCD that surround the production components. In one form, the bounding box module 24 initially generates a two-dimensional bounding box based on the PCCD by performing a point-in-polyhedron routine on the PCCD for the test rotation value identified by the alignment module 16 and generating the two-dimensional bounding box based on the output of the point-in-polyhedron routine. As an example, performing the point-in-polyhedron routine includes generating, for the test rotation value and one or more additional phase shifts relative to the test rotation value (e.g., +/−90-degree phase shifts up to 360 degrees), a plurality of polyhedrons (e.g., vertices, edges, faces, surfaces, and materials that collectively form a polyhedral representation of the components, such as volumetric triangles) within a region defined by the reference points. In one form, the bounding box module 24 may employ known vector graphic rendering systems to generate the polyhedrons, such as OpenGL and/or Direct3D.

The point-in-polyhedron routine also includes determining, for the test rotation value and one or more additional phase shifts relative to the test rotation value, a portion of the PCCD within the polyhedrons and determining the orientation of the production components associated with the PCCD based on the largest portion of the PCCD within the polyhedrons associated with the given rotation value. Subsequently, the bounding box module 24 generates the two-dimensional bounding box based on the determined orientation and using, for example, known bounding box generation routines.

In one form, the bounding box module 24 converts the two-dimensional bounding box into the three-dimensional bounding box by performing a cropping routine. As an example, the cropping routine includes determining, using known image processing routines (e.g., a difference-based image processing routine, a semantic-based image processing routine, pixel conversion routines, among others), a resolution of the rotated PCCD based on one or more metrics associated with the two-dimensional bounding boxes, such as a distance between edges of the two-dimensional bounding boxes, the area of the two-dimensional bounding boxes, and/or the length/width of the two-dimensional bounding boxes. Subsequently, the bounding box module 24 iteratively adjusts the one or more metrics to reduce the area of the two-dimensional bounding box until the vertices thereof correspond to the contours of the rotated PCCD and projects the remaining vertices onto the other dimension to form the three-dimensional bounding box. As an example and as shown in FIG. 4, the bounding box module 24 performs the point-in-polyhedron routine and cropping routine described herein to generate the three-dimensional bounding box bounded at least by vertices 80 associated with the input cluster 70-4.

Figure 5:
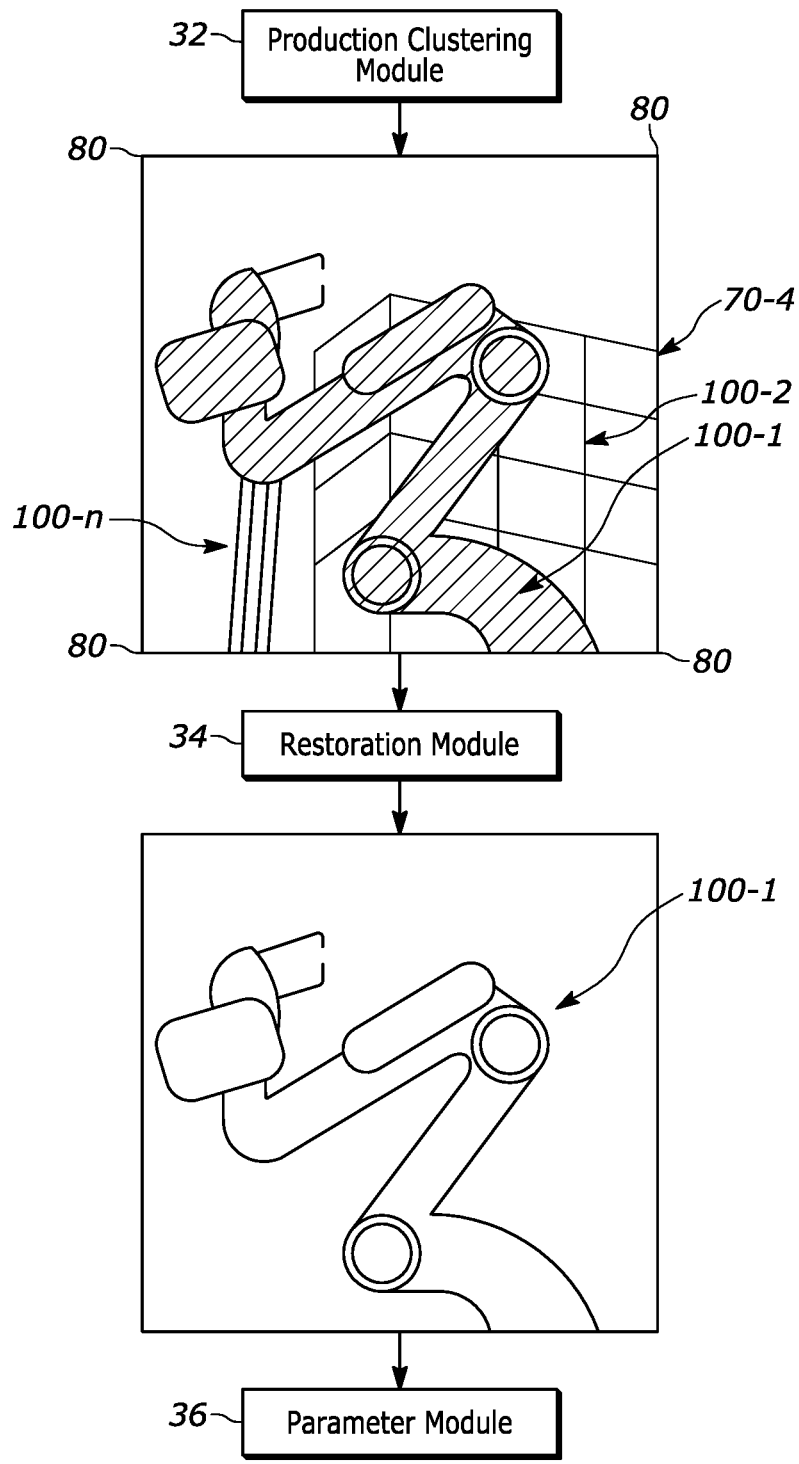
FIG. 5 illustrates rotated production component cloud data that is segmented into production clusters in accordance with the teachings of the present disclosure.

In one form, the production component module 30 includes a production clustering module 32, a restoration module 34, and a parameter module 36. In one form, the production clustering module 32 segments, for each of the input clusters 70, the rotated PCCD into a plurality of production clusters based on the corresponding three-dimensional bounding box. Each production cluster 100 may include a given set of the rotated PCCD within the corresponding three-dimensional bounding box. In one form, the production clustering module 32 segments the rotated PCCD into the production clusters in a similar manner as the input clustering module 12 and, more specifically, based on a predefined Euclidean distance, a predefined number of clusters, and a predefined cluster density. It should be understood that the predefined Euclidean distance, the predefined number of clusters, and the predefined cluster density of the production clustering module 32 may be different than the predefined Euclidean distance, the predefined number of clusters, and the predefined cluster density of the input clustering module 12. As an example and as shown in FIG. 5, the production clustering module 32 clusters the rotated PCCD associated with the input cluster 70-4 and the three-dimensional bounding box defined at least by the vertices 80 into production clusters 100-1, 100-2, . . . 100-n (collectively referred to hereinafter as "production clusters 100").

In one form, the restoration module 34 is configured to separate each of the production components associated with the production clusters 100 and adjust the orientation of the corresponding rotated PCCD such that the asset reverts to the original orientation and/or point cloud data location associated with the original PCCD obtained by the point cloud module 10. In one form, the parameter module 36 is configured to determine one or more parameters associated with the production components based on the plurality of production clusters and the one or more asset types determined by the neural network module 20. As an example, the parameter module 36 determines one or more parameters that include, but are not limited to: a length, width, height, and/or orientation of the production component. Furthermore, the parameter module 36 may uniquely adjust, refine, or determine the one or more parameters based on the asset type being, for example, a robot, a workpiece, among other asset types of the production components.

In one form, the control module 40 is configured to selectively control one or more manufacturing processes and/or perform a corrective action based on the one or more parameters associated with the production components. As an example, the control module 40 may broadcast a command to a mobile robot to adjust its position and/or orientation based on the one or more parameters of a workpiece (as the production component) when performing a given manufacturing process, such as a machining operation, a workpiece transfer operation, a welding operation, a curing operation, an inspection/quality control operation, among others. As another example, the control module 40 may broadcast a notification and/or an alert to a remote computing device when the one or more parameters of the production component are not within nominal or predicted tolerances/conditions. It should be understood that the control module 40 may perform various other types of manufacturing process control and/or corrective actions and are not limited to the examples described herein.

Figure 6:
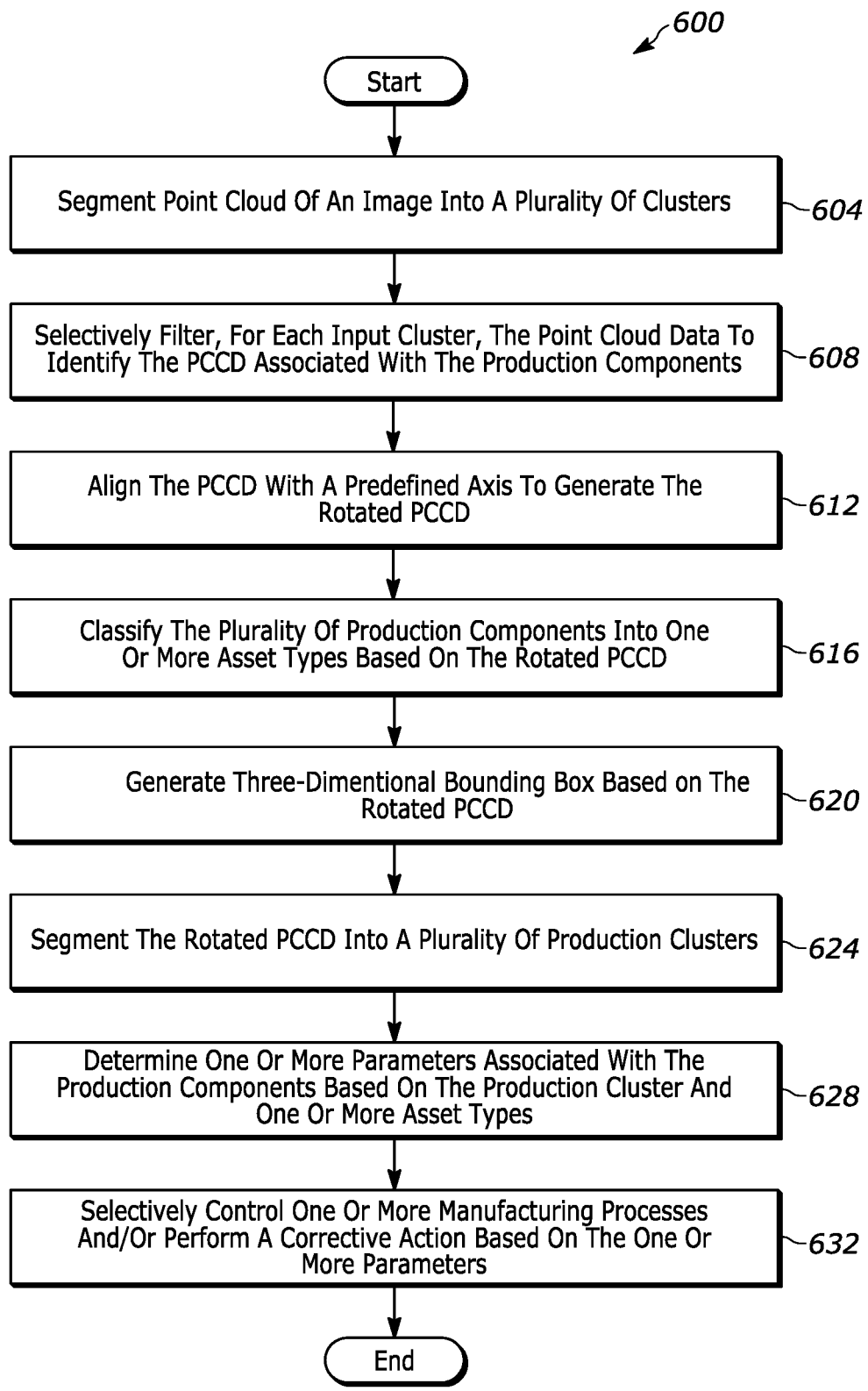
FIG. 6 is a flowchart illustrating an example control routine in accordance with the teachings of the present disclosure.

Referring to FIG. 6, a flowchart illustrating a routine 600 for identifying a plurality of production components of the manufacturing environment 5 is shown. At 604, the point cloud module 10 segments point cloud data of an image into a plurality of input clusters. At 608, the point cloud module 10 selectively filters, for each input cluster, the point cloud data to identify the PCCD associated with the production components and aligns the PCCD with a predefined axis to generate the rotated PCCD at 612. At 616, the neural network module 20 classifies the plurality of production components into one or more asset types based on the rotated PCCD and generates a three-dimensional bounding box based on the rotated PCCD at 620. At 624, the production component module 30 segments the rotated PCCD into a plurality of production clusters and determines one or more parameters associated with the production components based on the plurality of production clusters and the one or more asset types at 628. At 632, the control module 40 selectively controls one or more manufacturing processes and/or performs a corrective action based on the one or more parameters associated with the production components.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for identifying a plurality of production components of a manufacturing environment, the method comprising:

segmenting point cloud data of an image into a plurality of input clusters, wherein each of the plurality of input clusters includes a given set of point cloud data from among the point cloud data;

for each of the plurality of input clusters:

selectively filtering the given set of point cloud data to identify production component cloud data (PCCD) associated with a given set of the plurality of production components;

aligning the PCCD with a predefined axis to generate a rotated PCCD;

classifying the given set of the plurality of production components into one or more asset types based on the rotated PCCD;

generating a three-dimensional bounding box based on the rotated PCCD;

segmenting the rotated PCCD into a plurality of production clusters, wherein each of the plurality of production clusters includes a given set of the rotated PCCD within the three-dimensional bounding box; and adjusting an orientation of the rotated PCCD and thereby reverting the rotated PCCD to an original point cloud data location associated with the given set of the plurality of production components based on one or more parameters associated with the given set of the plurality of production components.

2. The method of claim 1, wherein the point cloud data is segmented based on a predefined Euclidean distance, a predefined number of clusters, and a predefined cluster density.

3. The method of claim 1 further comprising downsampling image data of the image to generate the point cloud data.

4. The method of claim 1, wherein selectively filtering the given set of point cloud data to identify the PCCD further comprises removing nonproduction component cloud data (NCCD) from among the given set of point cloud data, and wherein the NCCD is associated with one or more nonproduction components.

5. The method of claim 4, wherein the NCCD has a dimension ratio that is less than a threshold dimension ratio, and wherein the dimension ratio is based on a length of the given set of point cloud data and a width of the given set of point cloud data.

6. The method of claim 1, wherein the rotated PCCD corresponds to an isometric view of the set of the plurality of production components.

7. The method of claim 1, wherein the predefined axis is based on a predefined tilt angle, a predefined rotation angle, or a combination thereof.

8. The method of claim 1, wherein classifying the given set of the plurality of production components into the one or more asset types is further based on a convolutional neural network routine.

9. The method of claim 1, wherein generating the three-dimensional bounding box based on the rotated PCCD further comprises:

generating a two-dimensional bounding box associated with the given set of the plurality of production components based on the rotated PCCD; and converting the two-dimensional bounding box into the three-dimensional bounding box.

10. The method of claim 9, wherein generating the two-dimensional bounding box associated with the given set of the plurality of production components is further based on a point-in-polyhedron routine.

11. The method of claim 9, wherein converting the two-dimensional bounding box into the three-dimensional bounding box is further based on a cropping routine, wherein the cropping routine comprises:

determining, via one or more image processing routines, a resolution of the rotated PCCD based on one or more metrics associated with the two-dimensional bounding box;

adjusting the one or more metrics until one or more vertices of the two-dimensional bounding box correspond to one or more contours of the rotated PCCD;

reducing an area of the two-dimensional bounding box in response to adjusting the one or more metrics; and projecting any remaining vertices onto another dimension to generate the three-dimensional bounding box.

12. The method of claim 1, wherein the rotated PCCD is segmented based on a predefined Euclidean distance, a predefined number of clusters, and a predefined cluster density.

13. The method of claim 1, wherein the one or more parameters associated with the given set of the plurality of production components include a length, a width, a height, an orientation, or a combination thereof.

14. A system for identifying a plurality of production components of a manufacturing environment, the system comprising:
   one or more processors and one or more nontransitory computer-readable mediums comprising instructions that are executable by the one or more processors, wherein the instructions comprise:
      segmenting point cloud data of an image into a plurality of input clusters, wherein each of the plurality of input clusters includes a given set of point cloud data from among the point cloud data;
      for each of the plurality of input clusters:
         selectively filtering the given set of point cloud data to identify production component cloud data (PCCD) associated with a given set of the plurality of production components;
         aligning the PCCD with a predefined axis to generate a rotated PCCD;
         classifying the given set of the plurality of production components into one or more asset types based on the rotated PCCD;
         generating a three-dimensional bounding box based on the rotated PCCD;
         segmenting the rotated PCCD into a plurality of production clusters, wherein each of the plurality of production clusters includes a given set of the rotated PCCD within the three-dimensional bounding box; and
         adjusting an orientation of the rotated PCCD and thereby reverting the rotated PCCD to an original point cloud data location associated with the given set of the plurality of production components based on one or more parameters associated with the given set of the plurality of production components.

15. The system of claim 14, wherein the point cloud data is segmented based on a predefined Euclidean distance, a predefined number of clusters, and a predefined cluster density.

16. The system of claim 14 further comprising downsampling image data of the image to generate the point cloud data.

17. The system of claim 14, wherein selectively filtering the given set of point cloud data to identify the PCCD further comprises removing nonproduction component cloud data (NCCD) from among the given set of point cloud data, and wherein the NCCD is associated with one or more nonproduction components.

18. The system of claim 17, wherein the NCCD has a dimension ratio that is less than a threshold dimension ratio, and wherein the dimension ratio is based on a length of the given set of point cloud data and a width of the given set of point cloud data.

19. The system of claim 14, wherein the rotated PCCD corresponds to an isometric view of the set of plurality of production components.

20. The system of claim 14, wherein the predefined axis is based on a predefined tilt angle, a predefined rotation angle, or a combination thereof.

* * * * *